United States Patent [19]

Garrett et al.

[11] 3,729,597

[45] Apr. 24, 1973

[54] TELEPHONE TRUNK-MONITORING PROBE INSTRUMENT

[76] Inventors: Jim C. Garrett; Robert H. Johnson; Jack Shelton, all of 3300 East Spring Street, Long Beach, Calif. 90806

[22] Filed: Aug. 3, 1971

[21] Appl. No.: 168,670

[52] U.S. Cl. ....... 179/175, 179/175.3

[51] Int. Cl. ....... H04m 3/22, H04b 3/46

[58] Field of Search ....... 179/175, 175.1 R, 179/175.3; 324/133, 72.5; 340/249

[56] References Cited

UNITED STATES PATENTS

| | | | |
|---|---|---|---|
| 3,157,870 | 11/1964 | Marino et al. | 324/133 |
| 3,416,131 | 12/1968 | MacKenzie et al. | 340/249 |
| 2,956,229 | 10/1960 | Henel | 324/133 |

*Primary Examiner*—Kathleen H. Claffy
*Assistant Examiner*—Douglas W. Olms
*Attorney*—Hyman Jackman

[57] ABSTRACT

A pencil-like instrument for monitoring telephone trunk lines in a manner that will not interfere or affect said lines, if in use, said instrument comprising a handle that constitutes a casing which houses a circuit board mounting all of the components of the instrument including a probe element which extends from one end of the casing, and a visual indicator disposed in the opposite end and visible from that end.

4 Claims, 5 Drawing Figures

INVENTORS
JIM C. GARRETT
ROBERT H. JOHNSON
JACK SHELTON
BY
Hyman Jackman
ATTORNEY Patented April 24, 1973

3,729,597

2 Sheets-Sheet 2

INVENTORS
JIM C. GARRETT
ROBERT H. JOHNSON
JACK SHELTON
BY Hyman Jackman
ATTORNEY

TELEPHONE TRUNK-MONITORING PROBE INSTRUMENT

BACKGROUND OF THE INVENTION

1. Field of the Invention

In telephone central offices for monitoring the trunks of a bank thereof to locate the first trunk of a bank that is idle and, therefore, available.

2. Description of the Prior Art

The applicants, manufacturers of a wide range of instruments and other service and testing items for telephone companies and their subsidiaries, are unaware of any devices or instruments that have comparable utility for monitoring trunks. The common method of monitoring a telephone trunk entails the use of a switchman's "butt-in," i.e., use of a test telephone that listens in on a trunk and to the conversation (if any) taking place to determine the idle or busy condition of the line. Such a procedure, from the standpoint of customer service, has become impractical and, moreover, if frowned upon because of the legal aspects involved.

SUMMARY OF THE INVENTION

A probe instrument comprising a two-contact probe for wedging between terminal points of the Tip and Ring wires of a telephone trunk to pick up whatever voltage there may be across said wires to show whether the trunk is idle or busy. On an idle trunk, there being no loop resistance present, the full central office voltage will reach and illuminate a visual indicator on an end of the instrument through solid state circuitry housed in the handle of the instrument. On a busy trunk the voltage reaching said circuitry, being lower, the indicator will remain dark. In the latter case, the increased resistance serves to prevent interference with the busy trunk and also prevents the creation of noises on a busy trunk.

The above generally characterized invention has for its objects to provide a simple, hand-manipulated instrument for determining whether a telephone trunk line is in use regardless of Tip or Ring polarities; to provide such an instrument for monitoring a trunk without imposition of noisy interference in trunks that are in use; to perform the above monitoring function and yet not listen in to any conversation in progress; and to visually indicate the idle trunk condition.

This invention also has for its objects to provide such means that are positive in operation, convenient in use, easily installed in a working position and easily disconnected therefrom, economical of manufacture, relatively simple, and of general superiority and servicability.

The invention also comprises novel details of construction and novel combinations and arrangements of parts, which will more fully appear in the source of the following description, which is based on the accompanying drawing. However, said drawing merely shows, and the following specification merely describes one embodiment of the present invention, which is given by way of illustration or example only.

In the drawing, like reference characters designate similar parts in the several views.

DETAILED DESCRIPTION OF THE PREFERRED EMBODIMENT

The hereinafter described instrument is capable of indicating busy or idle conditions on trunks in telephone offices having a D.C. supply in the general range of 47 to 52 volts, the voltage range now commonly used. Insofar as this invention is concerned, the above range is exemplary since any change in said voltages will merely entail a change in the electrical values of the elements shown in FIG. 3.

Figure 5:
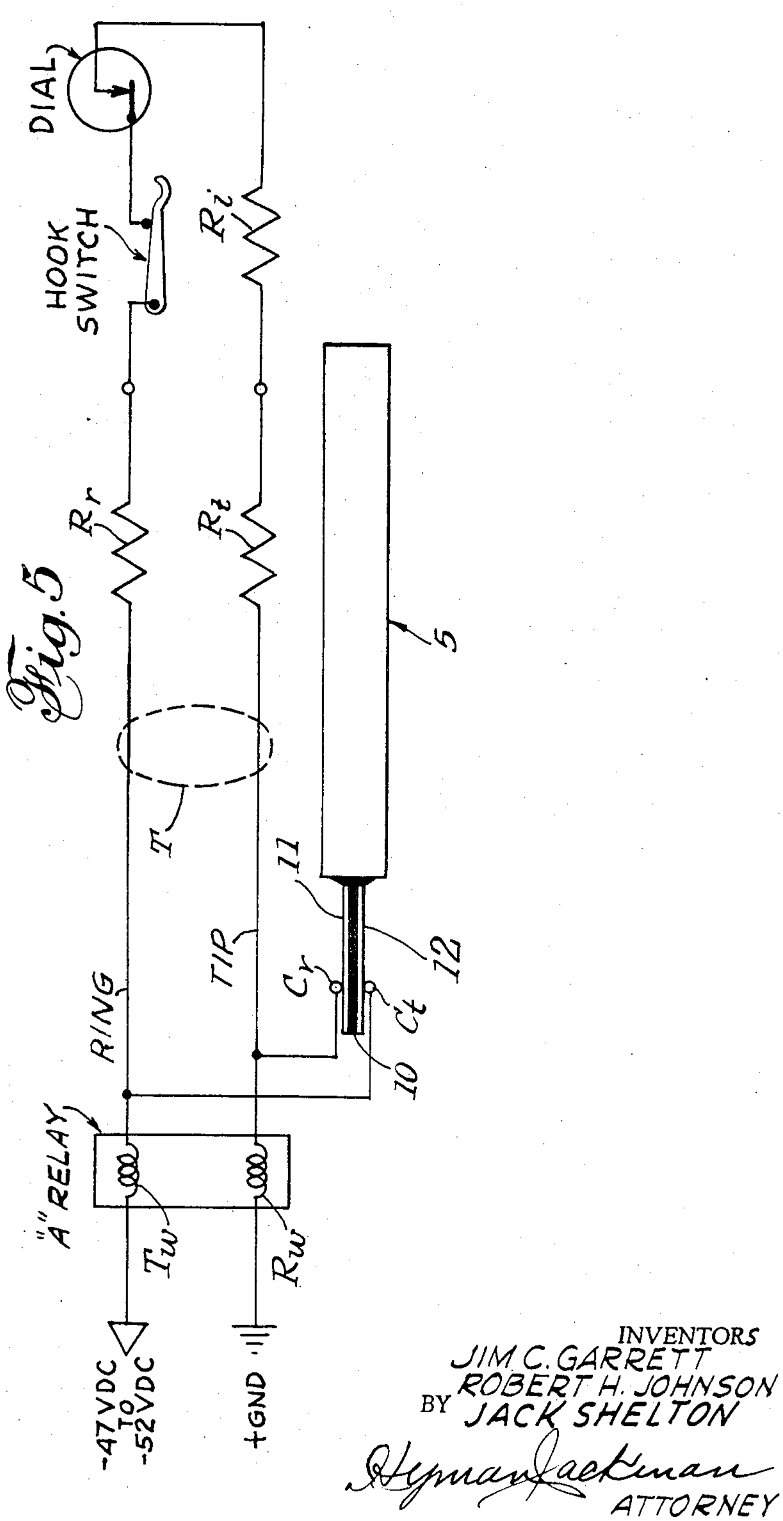
FIG. 5 is a diagrammatic view of a typical telephone line circuit to which the present instrument is adapted to be applied.

FIG. 5, diagrammatically, shows such a trunk T and the circuitry thereof. Said trunk is shown as a cable pair comprising Tip and Ring conductors, the former being connected to one polarity, the negative terminal of the tip conductor, and the latter being connected to the opposite polarity, i.e., positive ground. In practice, either polarity may exit on the Tip and Ring conductors.

Said diagram, FIG. 5, shows the "A" relay which is the typical pulsing relay across the Tip and Ring conductors, and a dial in series with said conductors. The Ring conductor, between the "A" relay and the dial is provided with a resistance $R_r$, with the usual hook switch between the latter and the dial. The Tip conductor, between said "A" relay and the dial is provided with a resistance $R_t$ and an instrument resistance $R_i$. Said three resistances constitute the loop resistance of the trunk T. It will be realized that the above description of FIG. 5 is of a typical telephone trunk and in which the Tip and Ring conductors are respectively provided with spaced terminals $C_r$ and $C_t$ constituting a jack for making operative contact with the present monitoring instrument.

Figures 1, 2, 3, 4:
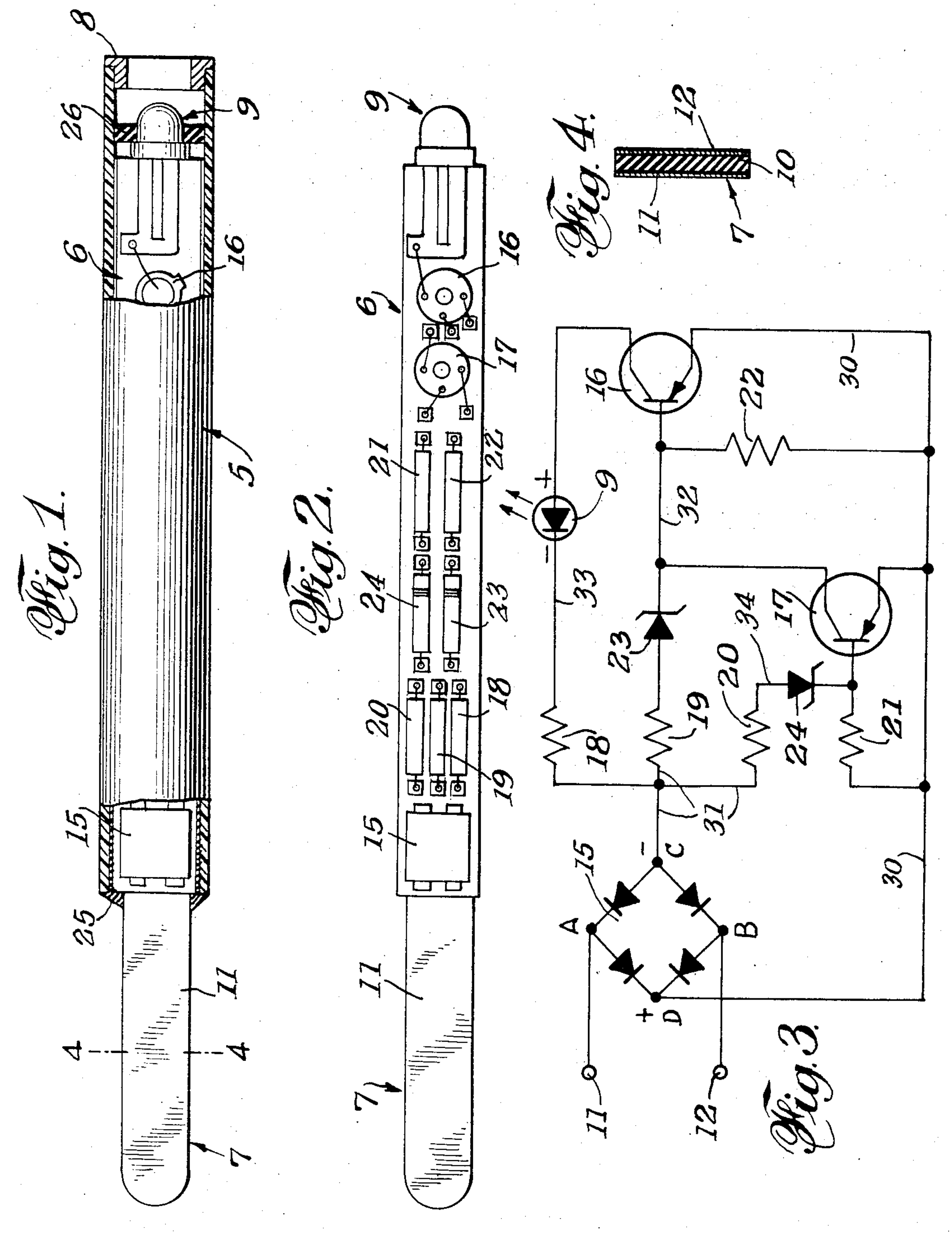
FIG. 1 is a side elevational view of the present probe instrument, the handle-housing thereof being shown partly in section to show detail.
FIG. 2 is a semi-diagrammatic view of said instrument showing the circuit board mounting the components of the instrument.
FIG. 3 is a wiring diagram of the circuitry mounted on said board.
FIG. 4 is an enlarged cross-sectional view as taken on line 4—4 of FIG. 1.

The present probe instrument, in regard to its physical aspects, comprises, generally, a holder comprising a phenolic or similar dielectric tube 5, a circuit board 6 housed in said tube and provided on one end with a two-contact probe element 7 that extends from one end of tube 5, and a metal, preferably aluminum, brushing 8 removably fitted to the other end of the tube 5 to afford access to a light-emitting diode 9, when necessary to do so in addition to rendering the light-emitting portion of said diode visible through the central opening in said bushing. As can be seen in FIG. 4, the probe element 7 comprises an elongated member integrally formed of three plies, the middle ply 10 being dielectric and the two outer plies 11 and 12 being metal and, therefore, electrically conducting. In the diagram, said plies 11 and 12 are shown as probe terminals. It will be clear, as shown in FIG. 5, that when said probe element 7 is inserted between and in respective electrical contact with the tip and ring terminals $C_r$ and $C_t$ of said telephone trunk 7, they will pick up whatever voltage there may be across the tip and ring terminals $C_r$ and $C_t$ of the trunk T.

Referring more particularly to FIG. 2 and to the diagram shown in FIG. 3, the circuit board 6, in addition to the probe element 7, at one end, and the light-emitting diode 9 at the other, mounts the following components:

A bridge-type rectifier 15 that has a steering function; a transistor 16 that has the basic function of turning on the light-emitting diode 9 at 47V., as based on the voltage range given above; and a second transistor 17 having the function of turning off transistor 16, thereby turning off the diode 9 at voltages above 53V, the high of said range, thereby preventing the circuit from drawing more than a few microamperes during dialing or ringing on a Tip or Ring circuit 7 and, thereby, not causing interference in the line.

In addition, to the above components, the circuit board mounts a 15K resistor 18 that is current-limiting to light-emitting diode 91 resistor 19 that allows high impendence and is current-limiting to transistor 16; a resistor 20 that is current-limiting to transistor 17; a resistor 21 for biasing off transistor 17; and a resistor 22 for biasing off transistor 16. The latter four resistors each has a 47K rating. Also mounted on said board are Zener diodes 23 and 24, the former having a voltage capacity of 44.4V. and, therefore, having threshold turn-on of 47V. and the latter a voltage capacity of 51V. and, therefore, a threshold turn-on of 53V.

After the circuit board 6 is inserted into the tube 5, a sealing material as black epoxy resin 25 in an uncured, viscous liquid form, is inserted into said tube. The same, when cured, seals the board into the tube to form an integrated assembly that serves also to render the probe element 7 ridigly affixed to said tube 5. A rubber gasket 26 is applied to cover the non-visual portion of the diode 9 and serves also to seal in the adjacent end of the circuit board 6.

CIRCUIT OPERATION

There are four conditions of the trunk 7 that the present instrument will monitor when the probe element 7 is inserted between the terminals $C_r$ and $C_t$ of said trunk to place the contact plies 11 and 12 of said element in electrical connection with the Tip and Ring conductors (cable pair) of said trunk. These conditions are: busy circuit (trunk in use), idle circuit (trunk not in use), ringing operation, and dialing operation.

Busy Circuit

Under the typical voltage range indicated, on a busy trunk 7, the Tip and Ring resistances may vary approximately between 100 ohms and 1400 ohms. This loop resistance in the trunk causes a current flow through the closed loop creating a voltage drop across the tip winding $T_w$ and the Ring winding $R_w$ of the A-relay. This voltage drop will produce a potential across the jack terminals $C_r$ and $C_t$ below 47 VDC. When the present probe is inserted between said contacts, as in FIG. 5, the voltage rating of the Zener diode 23 being at 44.4V., the potential applied to the Zener diodes 23 and 24 is not of sufficient magnitude to cause them to conduct. Thus, current flow is blocked to the light-emitting diode, which will remain dark to indicate the circuit is busy.

Idle Circuit

On an idle circuit, the telephone hook switch (FIG. 5) will be open, thereby opening the loop circuit through the dial and resistors $R_r$, $R_t$ and $R_t$, so the voltage across the terminals $C_r$ and $C_t$ will be open-circuit voltage. When the probe element is inserted between said contacts, the following happens:

a. The probe makes contact with the Tip and Ring circuit and conducts the potential thereof to the bridge rectifier 15 which, in turn, steers the current flow to the proper point in the circuit of FIG. 3;

b. Positive (+) is supplied to the emitters of transistors 16 and 17 through the conductor 30;

c. Negative (−) is supplied to the resistors 18, 19 and 20 through the conductors 31, thereby allowing usage of the present instrument irrespective of the polarity of the Tip and Ring conductors or whether the probe element is inserted between the jack terminals $C_r$, $C_t$ one way or the other;

d. The tip and ring conductors, being on open circuit voltage (47 to 52 VDC), the negative from the bridge 15 being steered to resistor 19, Zener diode 23, and the base of transistor 16 through a conductor 32, and the positive being steered to the emitter of said transistor through conductor 30, the potential difference between conductors 30 and 32 will cause Zener diode 23 and transistor 16 to conduct to cause current to flow through resistor 18 to the light-emitting diode 9 and the transistor 16 through the conductor 33. The diode 9 will illuminate to indicate the open-circuit in the Tip and Ring conductors of the trunk T; there will be no current conduction to Zener diode 24 and transistor 17 because, due to the resistances of the resistors 19, 20 and 21, the voltage in conductor 34 will be below 53V.

Ringing Operation

During ringing operations, the loop resistance is open and the ringing capacitor of the system is in circuit, thereby allowing the ringer to function. Thus the line condition potentialwise is similar to an idle line open-circuit condition with intervals of flashing due to the AC generator's 90 VAC being imposed on the voltage across the Tip and Ring conductors. Typically, the ringing generator is on for two seconds with four seconds silent intervals. During this action, the circuit functions as follows:

a. The silent period functions similarly to the idle circuit function, as above.

b. The ringing generator period is on negative (−) half cycle as it rises above −53V toward 140 VAC (approx.) causing Zener diode 24 to conduct through resistor 20 and the base of transistor 17, to the emitter of said transistor, to the positive terminal of bridge 15. This causes the transistor 17 to conduct and this conductance causes the base of transistor 16 to be biased off due to lack of forward emitter-based voltage. In this manner excess current drain is prevented, the same, in turn, preventing "ring tripping" (an operation in the relay equipment which causes ringing to stop). As a result of the above, the positive (+) half cycle of ringing is lowered to +40V (Approx.) by subtraction of −50 VDC that is on the line. Thus, this half cycle has insufficient potential to cause Zener diode 23 to conduct, the same producing a visible flash in the light-emitting diode 9.

Dialing Operation

Manipulation of the dial causes a series of pluses to be transmitted to the A -relay by opening the circuit to the relay by means of a dial interrupter. During such dial pulse, an open circuit and open circuit voltage exist (Typically, 60 milli-seconds). Also, during the open portion of the dial pulse, the inductive collapsing relay field is present (400 to 600 VDC). It is the purpose of Zener diode 24 and transistor 17 to switch transistor 17 and the light-emitting diode off during the collapsing field so there will be no interference with the release of the A -relay in the dialing process. Any low foreign circuit resistance would prevent the A -relay from releasing properly during the open period to, thereby, cause "misdialing."

It will be seen from the foregoing that the present instrument may be safely carried in a breast pocket in the manner of a pen or pencil. Although the contacts 11 and 12 are exposed, they may be safely handled because the instrument is, per se, without power, deriving its power from the potentials across the trunk only when said contacts are inserted between the jack terminals 11 and 12. Thus, my means of the usual pocket clip, the instrument may be carried in a breast pocket until it is desired to use the same as a probe.

It will be evident that when the instrument is inserted in a jack and the visual indicator remains dark to show a busy condition, it may be left in that position, since the instrument does not impose noise or any abnormal conditions on the busy line. The installer, repairman, switchman, or other person may continue testing of other trunks. When the indicator illuminates, he will know the line is idle.

The foregoing also indicates that the present instrument gives indication of the status of a line or repeater on the basis of "light" when idle, and "dark" when busy. Therefore, as above described, dialing and ringing operations can be detected since the "0n" "off" sequences of such operations can be recognized.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. A probe instrument for monitoring the tip and ring conductors of a telephone trunk and across which open-circuit voltage appears when the trunk is idle, and a lesser potential, due to the loop resistance in the trunk, when busy, is present across the trunk conductors, said conductors being provided with spaced terminals constituting a jack, said instrument comprising:

a. a pair of mutually insulated contacts adapted for insertion between and in electrical engagement with the jack terminals to sense the voltage across the tip and ring conductors, b. a visual indicator that illuminates when the trunk is idle and remains dark when the trunk is busy, c. a diode bridge rectifier connected across the mentioned contacts, the diodes of said bridge being arranged to steer the polarity received by said contacts from the jack terminals with which the contacts are engaged, to positive and negative points, and d. a sensing and indicating circuit connnected across said points of the bridge rectifier and showing the voltage drop less than that of the bridge diodes, said circuit including the mentioned visual indicator and further including:

1. a primary transistor, and a low voltage Zener diode to control switching on of said transistor, and
2. a secondary transistor, and a higher voltage Zener diode that, for ring voltages in excess of the Zener Zener diode voltage, the latter transistor is turned on and the primary transistor turned off, thereby holding the visual indicator off due to the minimum current in the primary transistor.

2. A probe instrument according to claim 1, including:

a. an elongated hollow body with the pair of contacts extending from one end of said body, and the visual indicator as the opposite end and visible from the latter end, and b. the diode bridge rectifier, the sensing and indicating circuit, and the elements embodied in said circuit being disposed within the body.

3. A probe instrument according to claim 2 in which the visual indicator comprises a light-emitting diode, the illuminated portion of which is exposed from the end of the body opposite to the end from which the mentioned contacts extend.

4. A probe instrument according to claim 2 in which the operating components are, per se, without power until the contacts thereof are connected to a jack comprising terminals on the tip and ring conductors of a telephone trunk.

* * * * *